United States Patent [19]

Lederman

[11] Patent Number: 5,380,103
[45] Date of Patent: Jan. 10, 1995

[54] SELF TIGHTENING VENTING END CAP FOR VEHICLE WHEEL BEARING

[75] Inventor: Frederick E. Lederman, Sandusky, Ohio

[73] Assignee: General Motors Corporation, Detroit, Mich.

[21] Appl. No.: 140,941

[22] Filed: Oct. 25, 1993

[51] Int. Cl.⁶ .............................................. F16C 33/78
[52] U.S. Cl. ................... 384/489; 384/544; 301/108.3; 301/37.42
[58] Field of Search ............ 384/489, 544, 589; 301/108.1, 108.3, 37.42

[56] References Cited

U.S. PATENT DOCUMENTS

| | | | |
|---|---|---|---|
| 4,368,933 | 1/1983 | Motsch | 384/489 |
| 5,079,465 | 1/1992 | Schmidt et al. | 384/489 |
| 5,172,984 | 12/1992 | Lederman | 384/489 |
| 5,195,807 | 3/1993 | Lederman | 301/108.1 |

*Primary Examiner*—Lenard A. Footland
*Attorney, Agent, or Firm*—Patrick M. Griffin

[57] ABSTRACT

An end cap for sealing one side of the bearing space of a non powered vehicle wheel bearing having an inner spindle and a surrounding, outer hub. The outermost perimeter of the cap is securely latched to the outer surface of the edge of the hub. A concave channel molded integrally to the cap fits snugly inside the inner surface of the hub and has a base wall that is not square to the hub axis, but sloped slightly in a radially outward, axially inward orientation. The center cup section of the cap forms the inner wall of the concave channel. Inward pressure on the cap causes the base wall to flatten and the cylindrical wall to tend to diverge, tightening it seal against the inner surface of the hub. Outward pressure creates the opposite effect, as the cylindrical sealing wall converges and allows pressure to leak out, despite the lack of discrete venting openings.

1 Claim, 3 Drawing Sheets

SELF TIGHTENING VENTING END CAP FOR VEHICLE WHEEL BEARING This invention relates to vehicle wheel bearings in general, and specifically to a self venting end cap for a wheel bearing that has a provision for self tightening in response to an internal pressure drop.

BACKGROUND OF THE INVENTION

Vehicle wheel bearings with non powered inner races or spindles have the advantage of being able to be sealed on one side by a one piece end cap, which is a non rubbing, friction free seal. The disadvantage of an end cap is that it has a relatively large surface area. The inner surface of the cap is exposed to the internal bearing pressure, and the outer surface to ambient pressure. Each pressure may fluctuate relative to the other. If the internal pressure is higher, the cap is subject to expansion, which may tend to dislodge it. If the ambient pressure is higher, the end cap is subject to contraction that may be sufficient to temporarily break the seal with the hub and pull outside contaminants in. Temperature fluctuations also occur.

Conventional end caps are typically steel stampings which are rigid enough to resist any pressure fluctuations. Steel end caps also generally match the steel hubs to which they are secured in terms of temperature caused expansion and contraction. Newer cap designs save weight and expense, as well as providing better corrosion protection, by molding the end cap from plastic materials, which are also much more flexible and elastic than steel. This flexibility and elasticity can be used to advantage to provide integral venting mechanisms that relieve pressure before the cap can be dislodged. One example, disclosed in co assigned U.S. Pat. No. 5,172,984 to Lederman, provides slots in the cap that are blocked by the edge of the hub under normal pressures. When the cap expands or contracts, the slots become unblocked to allow pressure in or out. Another example, disclosed in co assigned U.S. Pat. No., 195,897 to Lederman, incorporates a small, deliberate fracture line at the center of the cup that can break and open in response to pressure fluctuations, and re close when pressure returns to an equilibrium.

SUMMARY OF THE INVENTION

The invention provides a molded one piece end cap without discrete openings or vents that is still able to vent excess internal pressure, but which self tightens in response to a depressed internal pressure. It also contains provision to assure continued sealing contact in the face of temperature induced expansion or contraction differentials.

In the embodiment disclosed, a conventional wheel bearing hub has an annular edge including a cylindrical inner surface. The end cap is integrally molded of a relatively thin and flexible plastic material with a pair of oppositely directed, generally U shaped channels molded into its rim. The outer channel is sized to wrap around and grip the annular edge of the hub. The inner channel has a cylindrical wall, shared with the outer channel, that is sized so as to closely abut and seal against the hub inner surface when the end cap is in an unflexed, free state. The base of the inner channel, in the free state, is not square to the hub, but instead is sloped radially outwardly at a slight angle. The center portion of the cap, which comprises most of its area, is cup shaped, and forms the inner wall of the inner channel.

In operation, inward or outward pressure on the cap causes the shared channel wall to tend to diverge or converge relative to the inner surface of the hub edge, rather than remain concentric thereto, which either tightens the seal, or allows venting. Specifically, when the bearing internal pressure falls and the cap sees an inward pressure, the inner channel base wall tends to flatten, and shared cylindrical wall is pushed out into the hub inner surface, tightening the seal. When the bearing pressure rises, the cap is bulged out, and the shared wall is pulled in from the hub surface enough to let internal pressure reach the outer channel. The outer channel is opened up enough to let excess pressure leak out, even though there are no venting slots or openings per se.

DESCRIPTION OF THE PREFERRED EMBODIMENT

These and other objects and features of the invention will appear from the following written description, and from the drawings, in which.

Figure 1:
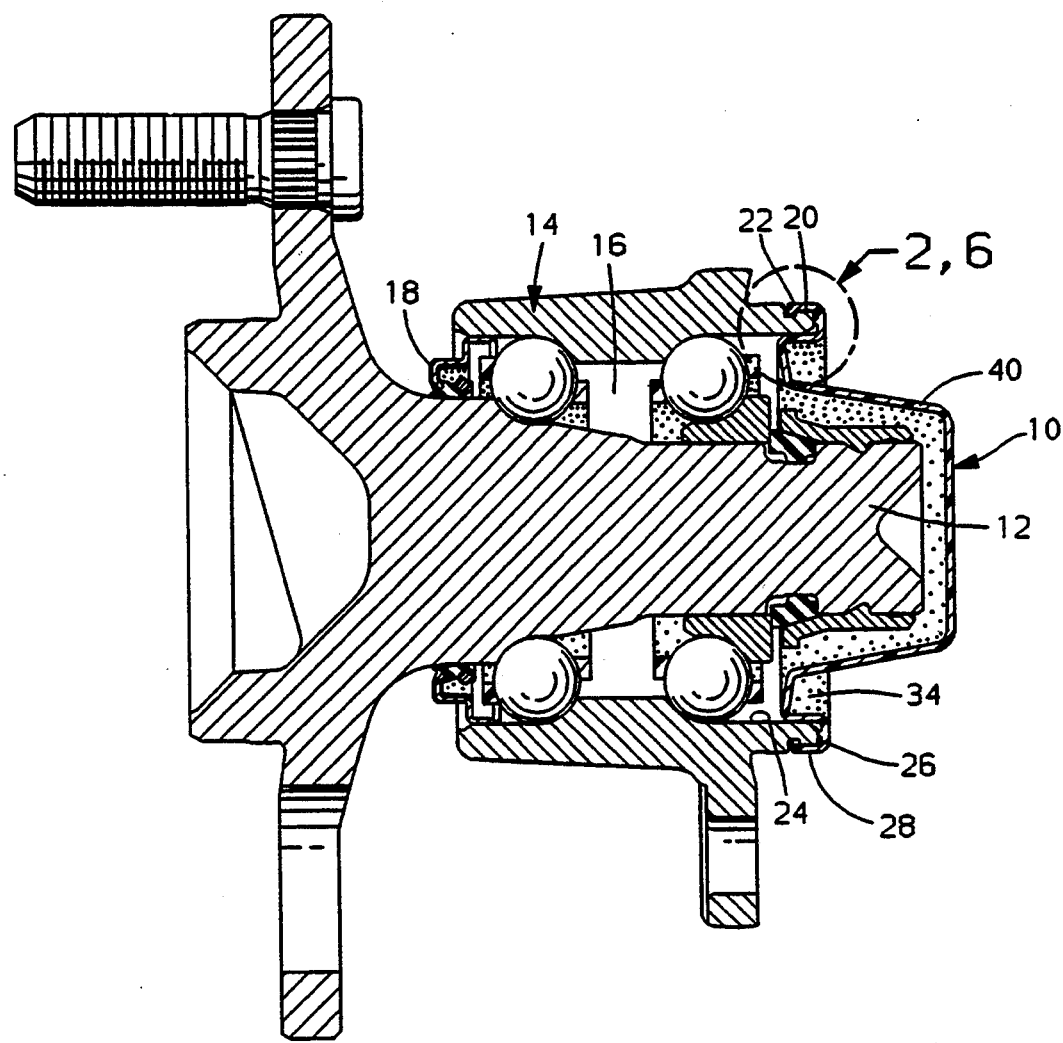
FIG. 1 is cross sectional view of a vehicle wheel bearing incorporating a preferred embodiment of the venting end cap of the invention, in pressure equilibrium.
Figure 2:
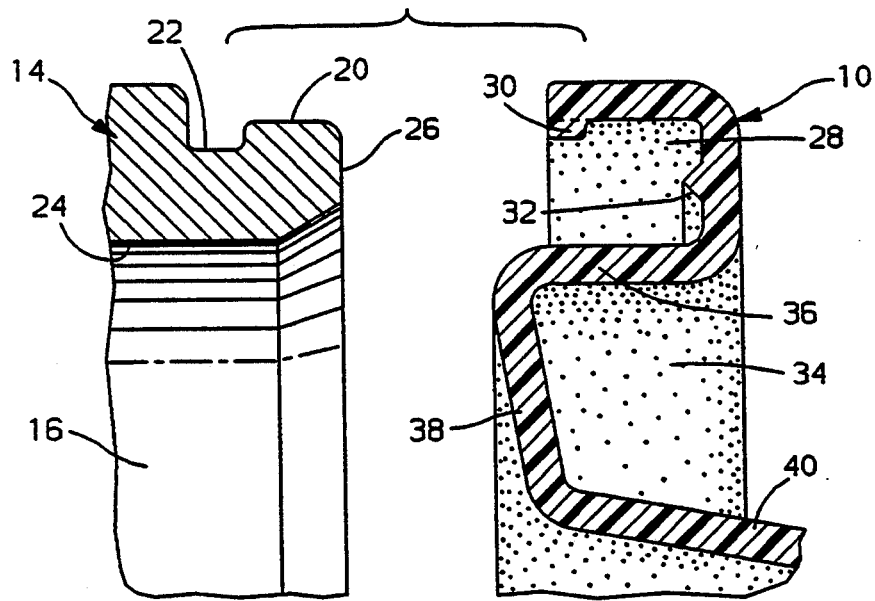
FIG. 2 is an enlargement of the circled portion of the hub of FIG. 1, with the end cap removed.

Referring first to FIGS. 1 and 2, a preferred embodiment of the end cap of the invention, indicated generally at 10, is incorporated in a vehicle wheel bearing that includes a rotatable inner spindle 12 and a surrounding outer hub, indicated generally at 14. Spindle 12 and hub 14 define an interior bearing space 16, which contains a significant volume of air and lubricant. At high speeds, internal friction generates heat, and outside heat is also conducted into space 16 from the brake rotor, not illustrated. Internal heating causes a pressure rise in space 16 relative to the outside or ambient pressure, due both to heating of the air and to gases released from heated lubricant. One side of space 16 is sealed by a conventional rubbing seal 18, which does not include any provision for overpressure relief. The other side is closed and sealed by end cap 10, which has no apertures or vent valves, but which is designed to either vent or self tighten in response to various conditions, as described below. FIG. 2 shows some structural detail of hub 14, with which end cap 10 is designed to cooperate. The edge of hub 14 comprises three surfaces, a cylindrical outer surface 20 that ends in a circular groove 22, a coaxial inner surface 24, and a chamfered annular face 26. Hub 14 is like that shown in U.S. Pat. No. 5,172,984 referred to above, but end cap 10 interacts differently with the various surfaces shown, as is described below.

Figure 3:
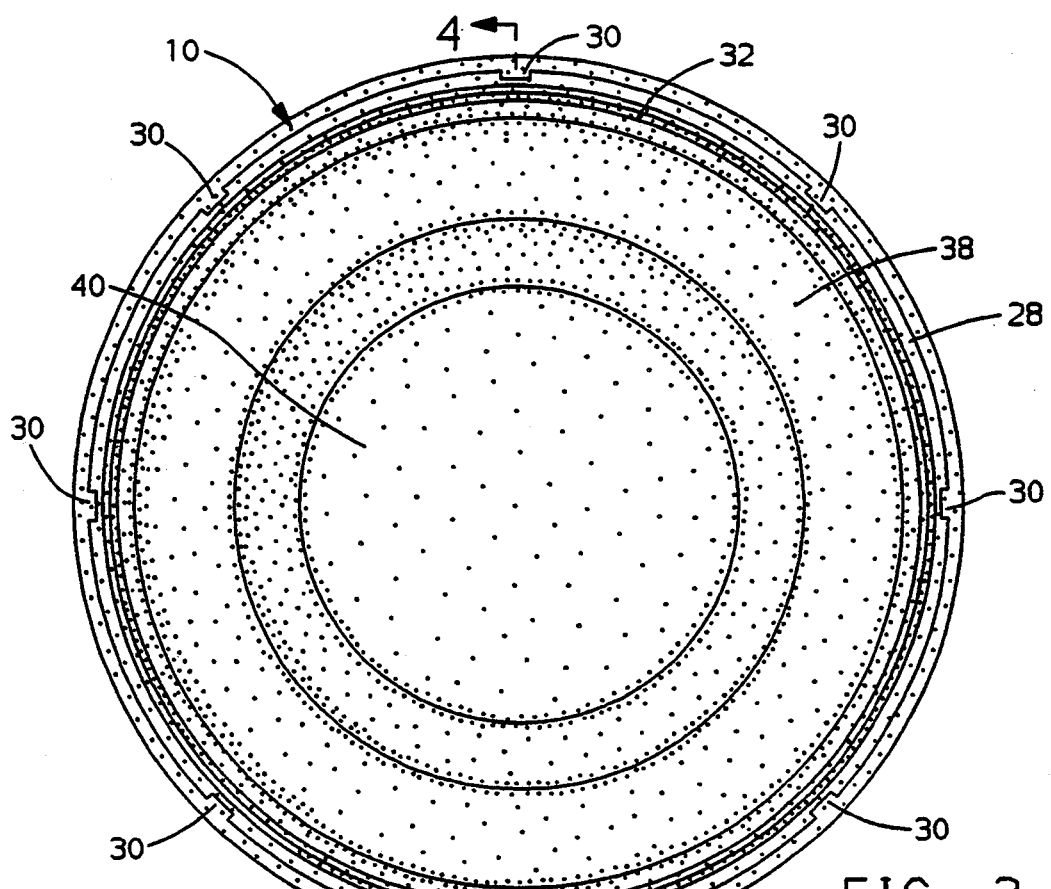
FIG. 3 is an inner axial view of the end cap alone.
Figure 4:
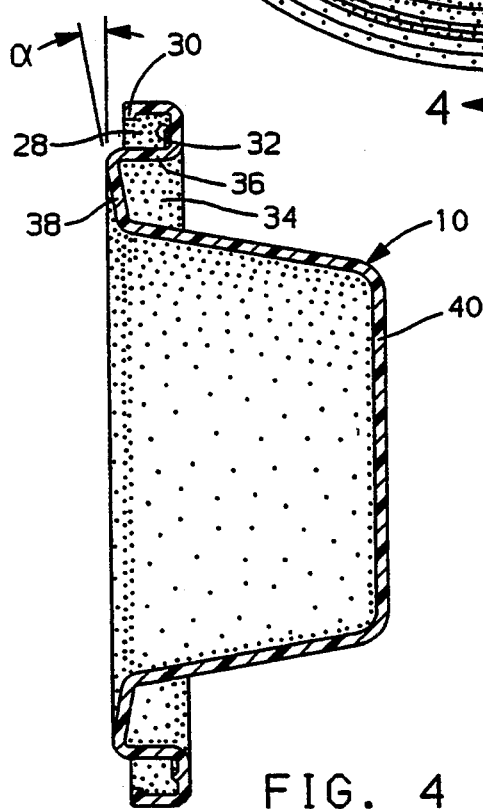
FIG. 4 is a cross sectional view taken along the line 4—4 of FIG. 3 showing the end cap in a free state, unstressed condition.

Referring next to FIGS. 2 through 4, the structural details of end cap 10 are illustrated, which is shown in its free state or unflexed condition. End cap 10 has a stepped cylindrical shape, injection molded of a relatively thin and flexible nylon or similar plastic material. As such, cap 10 is lightweight and corrosion proof, but subject to expansion and contraction, due both to pressure fluctuations and due to differential temperature effects relative to the steel hub 14. The perimeter or rim of cap 10 consists of two oppositely facing channels, each of which is basically U shaped in cross section and comprised of a series of cylindrical and annular elements. A first, outer channel 28 that faces axially inwardly relative to internal space 16 is sized so as to be capable, in general, of tightly gripping the edge of hub 14. Specifically, outer channel 28 has a series of eight barbs 30 that snap tightly into edge groove 22 and pull a sharp, circular lip 32 firmly against face 26. A second, inner channel 34 faces oppositely, concave as seen from the outside, with a cylindrical wall 36 shared with first channel 28 and sized so as to closely abut hub edge inner surface 24. Channel 34 also has generally annular base 38 which, as best seen in FIG. 4, does not lie in a plane square to the axis of hub 14, as is usual. Instead, it is sloped radially outwardly, and axially inwardly, making a slight angle alpha of about ten degrees. The central portion of cap 10 is a cup 40, which comprises the innermost wall of inner channel 34. Cup 40 is not perfectly cylindrical, but tapers outwardly, moving axially inwardly of cap 10. Those skilled in the molding art will recognize that cap 10 can be easily molded by only two mold halves that can be pulled apart along a central axis (coaxial to hub 14.) Only the barbs 30 overlap any other surface, and would therefore present resistance to pulling a mold. However, the flexibility of the material would be sufficient to allow the outer channel 28 to spread enough to pull the mold halves. That same flexibility is taken advantage of in operation, as described next.

Figure 6:
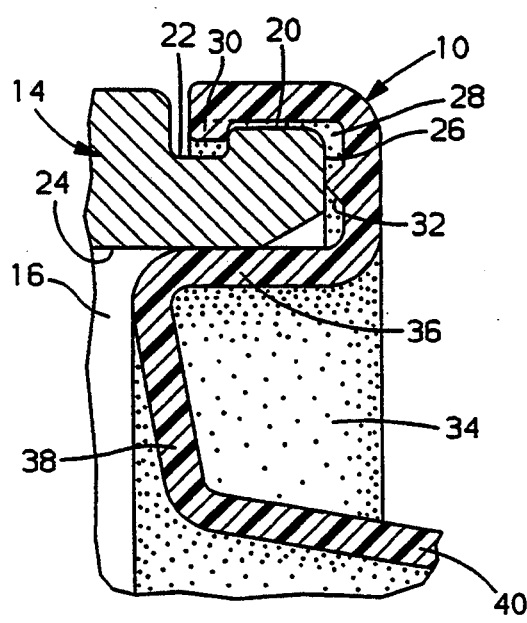
FIG. 6 is an enlargement of that portion of the end cap circled in FIG. 1 showing the reaction of the end cap to differential expansion due to temperature increase.
Figure 7:
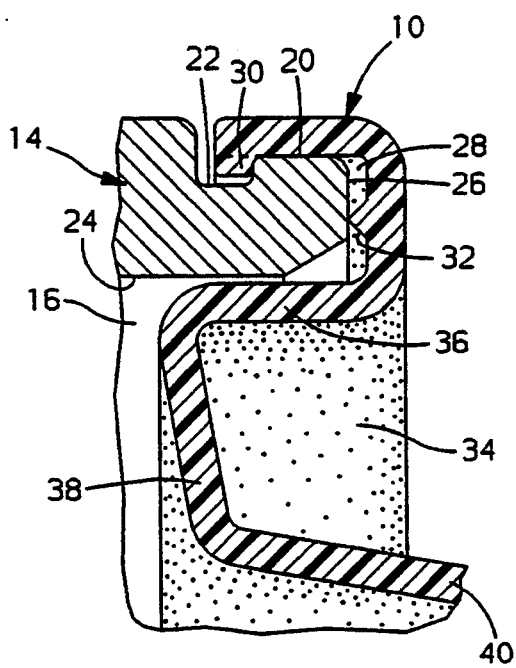
FIG. 7 is a view like FIG. 6 showing the reaction of the end cap to differential contraction due to temperature decrease.

Referring next to FIGS. 6 and 7, one disadvantage of plastic material, especially of nylon, is its differing thermal response relative to steel, such as the steel hub 14. This differential is severe enough that in some applications where nylon components are located in close proximity to steel components, it has been necessary to make provision to compensate for the differential. For example, some roller clutch designs incorporating nylon roller cages put slots in the cage to let the cage yield and avoid binding when it expands or contracts more than the clutch races that surround it. Here, a differential in expansion or contraction of cap 10 relative to hub 14 is compensated for by the fact that at least one surface of channel 28 stays in sealing contact with a surface of the edge of hub 14 regardless of the temperature response. For example, in FIG. 6, the result of rising temperature is illustrated. As cap 10 expands more than the edge of hub 14, the grip of channel 28 becomes less tight in the sense that some clearance opens up around hub surface 20. It becomes tighter on the other side, however, because wall 36 expands out more tightly into inner surface 24. Furthermore, there is enough tension in the contact between lip 32 and annular face 26 to maintain continual sealing contact at that interface. FIG. 7 shows the result of falling temperature, when cap 10 contracts more than hub 14. Basically the opposite occurs, with wall 36 tending to pull away from hub surface 24, but with surface 24 being more tightly gripped. Again, lip 32 retains contact with annular face 26 regardless. Therefore, the sealing effectiveness of cap 10 may be said to be substantially temperature independent.

Figure 5:
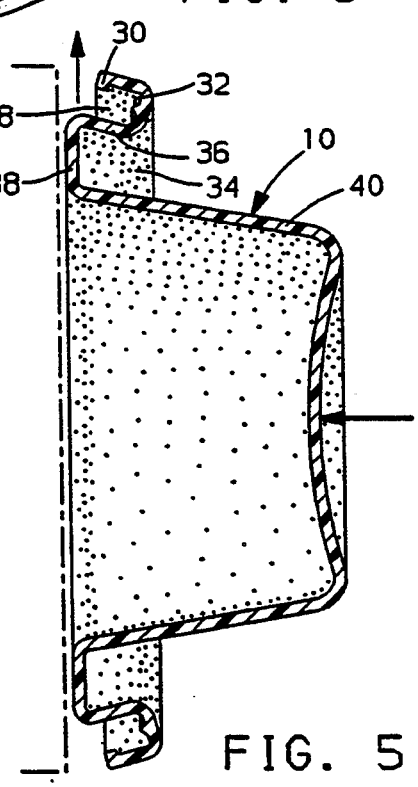
FIG. 5 is a view like FIG. 4, showing the end cap as it would react to an axially inward force on the center cup section.
Figure 9:
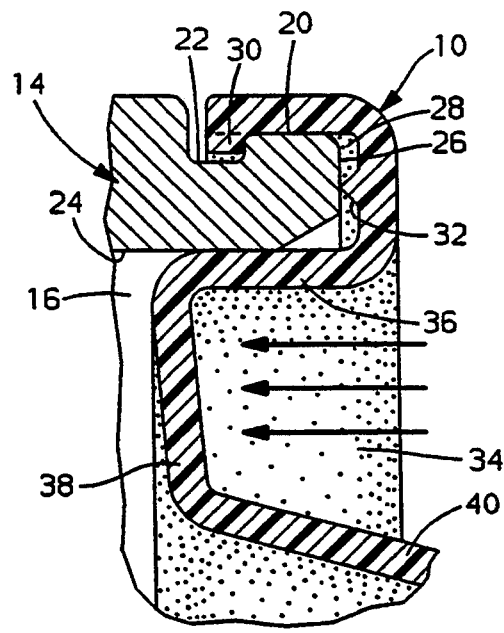
FIG. 9 is a view like FIG. 6 showing the reaction of the end cap to an internal pressure drop.

The main concern with a seal like end cap 10 is not differential temperature effects, however but differential pressure effects, which are illustrated in part in FIGS. 5 and 9. The distinctive free state shape of cap 10, with its sloped inner channel base wall 38 and tapered cup 40 creates a distinctive reaction to axial force on cap 10. The reaction to a negative pressure can be illustrated even with cap 10 removed, as shown in FIG. 5. A greater ambient pressure is seen most strongly on the end of central cup 40, creating an axially inward force, as illustrated by the arrow. In turn, the cup 40 spreads out slightly as it is pushed in, and the inner channel base wall 38 is flattened. Concurrently, the shared channel cylindrical wall 36 is bent outwardly, about the circular hinge line where cylindrical wall 36 joins outer channel 28, taking on a divergent, conical shape relative to hub 14. The reaction of wall 36 in the installed cap 10 will be different, since it is confined by the hub inner surface 24, but the tendency will be the same. That is, referring to FIG. 9, the higher ambient pressure will force cup 40 inwardly, and will flatten base wall 38. The cylindrical wall 36 will not actually bend out as in FIG. 5, since it is confined, but the axially innermost portion of it will still be forced more tightly into hub inner surface 24, increasing the strength of the seal. That part of wall 36 axially closest to the hinge line juncture with outer channel 28 would actually tend to move radially in, but since the axially inner portion of wall 36 tends to move radially out, the seal is tightened. Therefore, venting to relieve negative pressure is not a design intent.

Figure 8:
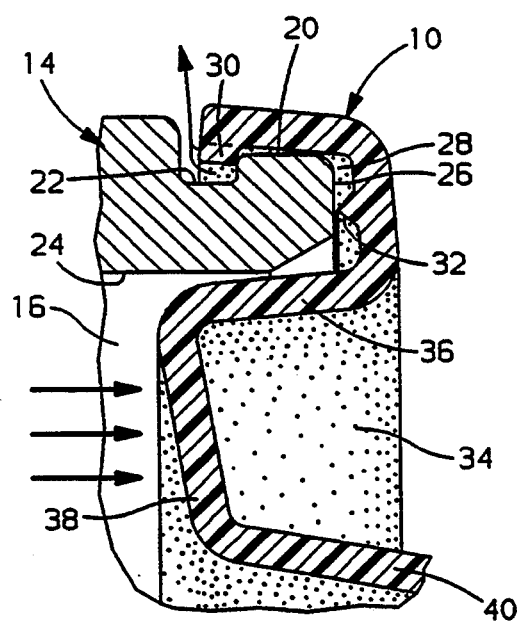
FIG. 8 is a view like FIG. 6 showing the reaction of the end cap to an internal pressure riser.

Referring next to FIG. 8, the response of cap 10 to a relatively higher pressure in bearing space 16 is illustrated. The higher pressure acts on the inside of cup 40 and pushes it axially out slightly, into a convergent conical shape which bends wall 36 inwardly about the hinge line and away from hub edge inner surface 24, a reversal of the reaction to a negative pressure. Concurrently, outer channel 28 is spread apart, which moves lip 32 away from hub face 26. This creates a path for pressure from space 16 to pass the chambered edge of hub inner surface 24 and reach the interior of outer channel 28. Continued outward bulging of cap 10 causes outer channel 28 to spread enough that its outer wall tilts about the fulcrum of the outer edge of hub face 26. Despite the absence of slots or other deliberate venting openings, the thin line of contact between the sharp outer edge of hub face 26 and the outer wall of channel 28 does not provide a tight seal, and pressure is able to leak out, as shown by the arrow. Pressure equilibrium eventually returns and cap 10 snaps back to its original shape.

In conclusion, the concave inner channel 34, with its sloped base wall 38, creates a distinctive swinging action, (as seen in cross section) about the juncture between shared cylindrical wall 36 and outer channel 28. The in and back reversal of the inner channel 34 provides a lever arm, in effect, about which axial force on the central cup 40, in or out, can act on wall 36 to bend it out or in. Variations in the disclosed embodiment could be made. The outer channel 28, which is three sided, continuous contact with the edge of hub 14, maintains continuous sealing contact to compensate for differential temperature effects. In terms of how the inner channel 34 operates to both self tighten and vent, however, all that is necessary is that the perimeter of cap 10 be fixed to and latched to the edge of hub 14 so as prevent cap 10 from blowing out until the wall 36 can bend in enough to vent. The sealing lip 32 is not absolutely necessary for complete sealing, because of the assured contact of the side walls of the outer channel 28 with at lease one cylindrical surface of the edge of hub 14. However, lip 32 does provide a convenient back up seal against face 26 that is insensitive to temperature effects. The angle alpha in inner channel base wall 38 could be lesser or greater, but it is important that it not be zero, that is, that base wall 38 not be in a plane square to the axis of hub 14, since it is the slope of base wall 38 that creates the bending action of cylindrical wall 36. Therefore, it will be understood that it is not intended to limit the invention to just the embodiment disclosed.

I claim:

1. A wheel bearing and end cap assembly, comprising, an inner spindle and coaxial outer hub having an annular edge including a cylindrical inner surface defining a bearing interior space that is subject internal pressure fluctuations relative to the outside pressure, an end cap integrally formed of a flexible material and including a first, radially outer channel of generally U shaped cross section facing axially inwardly of said hub and sized so as to tightly grip and seal against said annular edge, a second, radially inner channel of generally U shaped cross section facing axially outwardly of said hub and having a cylindrical wall shared with said outer channel and sized so as to closely abut said hub edge inner cylindrical surface when said end cap is in a free, unstressed state, said second channel also having a generally annular base which, in a free state, slopes radially outwardly at a slight angle relative to plane that is perpendicular to said hub, and, a central cup opening axially inwardly of said hub and forming the innermost wall of said second channel and exposed on the outside to ambient pressure and on the inside to internal bearing pressure, whereby, when said internal pressure is lower than ambient, said cup is forced axially inwardly, tending to flatten said base and bend said shared channel wall outwardly and into tighter sealing abutment with said hub, and when said internal pressure is higher, said cup is forced axially outwardly, tending to bend said shared channel wall inwardly and away from said hub to allow venting.

* * * * *